United States Patent
Scanlan et al.

(10) Patent No.: US 9,718,592 B1
(45) Date of Patent: Aug. 1, 2017

(54) COLLAPSIBLE REUSABLE CARRIER

(71) Applicants: Thomas Joseph Scanlan, Bellingham, WA (US); Mary Lou Jothen, Bellingham, WA (US)

(72) Inventors: Thomas Joseph Scanlan, Bellingham, WA (US); Mary Lou Jothen, Bellingham, WA (US)

( * ) Notice: Subject to any disclaimer, the term of this patent is extended or adjusted under 35 U.S.C. 154(b) by 402 days.

(21) Appl. No.: 14/303,391

(22) Filed: Jun. 12, 2014

Related U.S. Application Data

(60) Provisional application No. 61/834,165, filed on Jun. 12, 2013.

(51) Int. Cl.
| | | |
|---|---|---|
| *B65D 75/00* | (2006.01) | |
| *B65B 43/00* | (2006.01) | |
| *B65D 71/40* | (2006.01) | |
| *B31B 1/26* | (2006.01) | |

(52) U.S. Cl.
CPC .............. *B65D 71/40* (2013.01); *B31B 1/26* (2013.01); *B31B 2203/06* (2013.01)

(58) Field of Classification Search
CPC ........ B65D 9/12; B65D 9/22; B65D 11/1873; B65D 71/0003; B65D 83/305
USPC ....... 206/162, 170, 180, 192, 198, 549, 427, 206/171–173; 220/4.08, 4.09, 4.28, 4.31, 220/4.32; 493/162; 53/452
See application file for complete search history.

(56) References Cited

U.S. PATENT DOCUMENTS

| | | | |
|---|---|---|---|
| 1,061,297 A | | 5/1913 | Johnson |
| 1,747,900 A | | 2/1930 | Jenny |
| 2,279,864 A | | 4/1942 | Eide |
| 2,347,821 A | | 5/1944 | Goldner |
| 2,414,332 A | * | 1/1947 | Roumillat ................ B65D 9/12 206/165 |
| 2,510,591 A | * | 6/1950 | Listman ............. B65D 71/0003 206/199 |
| 2,530,849 A | * | 11/1950 | Wyatt .................. B65D 85/305 206/170 |
| 2,821,299 A | | 1/1958 | Crary |
| 2,840,293 A | | 6/1958 | Paige |
| 4,103,818 A | | 8/1978 | Raubenheimer |
| 4,744,613 A | * | 5/1988 | Brantingham ........... B25H 3/02 206/216 |
| 5,375,715 A | | 12/1994 | Serre et al. |
| 5,765,684 A | * | 6/1998 | Van Dore .......... B65D 11/1866 206/143 |
| 5,803,264 A | * | 9/1998 | Gersten ................ B65D 71/004 206/194 |
| 5,871,090 A | | 2/1999 | Doucette et al. |
| 5,941,377 A | | 8/1999 | Hart et al. |
| 6,334,531 B1 | * | 1/2002 | Valkovich .............. B65D 71/50 206/163 |
| 6,615,996 B1 | * | 9/2003 | Ivey ..................... A47B 73/006 206/175 |

(Continued)

*Primary Examiner* — Luan K Bui
(74) *Attorney, Agent, or Firm* — Michael R. Schacht; Schacht Law Office, Inc.

(57) ABSTRACT

A carrier comprises a lifting assembly and a box assembly. The lifting assembly defines at least one platform surface and at least one shoulder portion. The box assembly defines at least one intermediate slot. The at least one intermediate slots receives a portion of the main member such that the at least one shoulder portion engages at least a portion of the box assembly to transfer downward loads on the box assembly to the lifting assembly.

12 Claims, 12 Drawing Sheets

(56) References Cited

U.S. PATENT DOCUMENTS

| | | | |
|---|---|---|---|
| 7,185,758 B2* | 3/2007 | Cuomo | B65D 71/0014 206/162 |
| D664,044 S | 7/2012 | Robertson | |
| 8,297,437 B2 | 10/2012 | Smalley et al. | |
| 2004/0055908 A1* | 3/2004 | Cuomo | B65D 71/0014 206/198 |

* cited by examiner

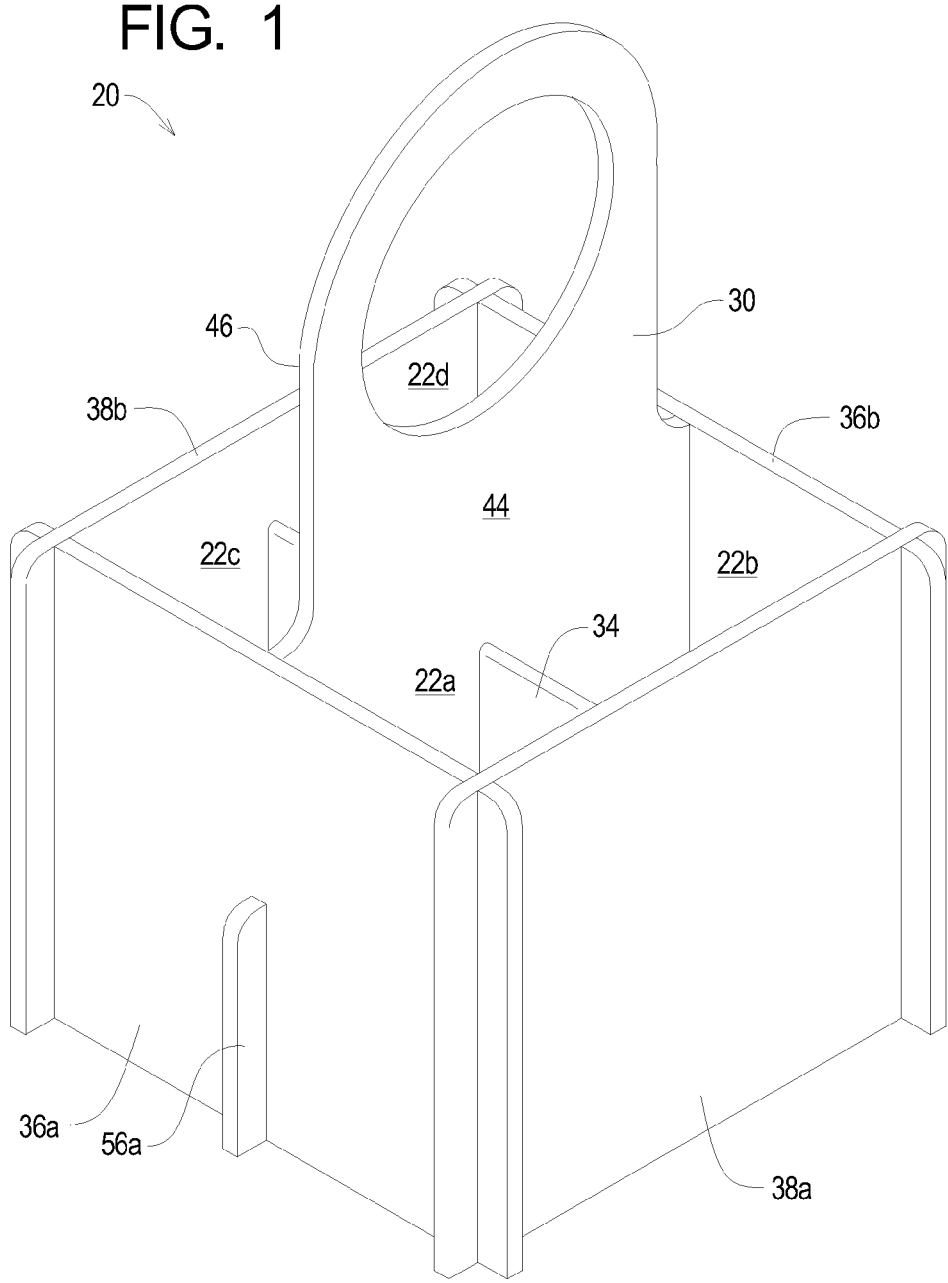

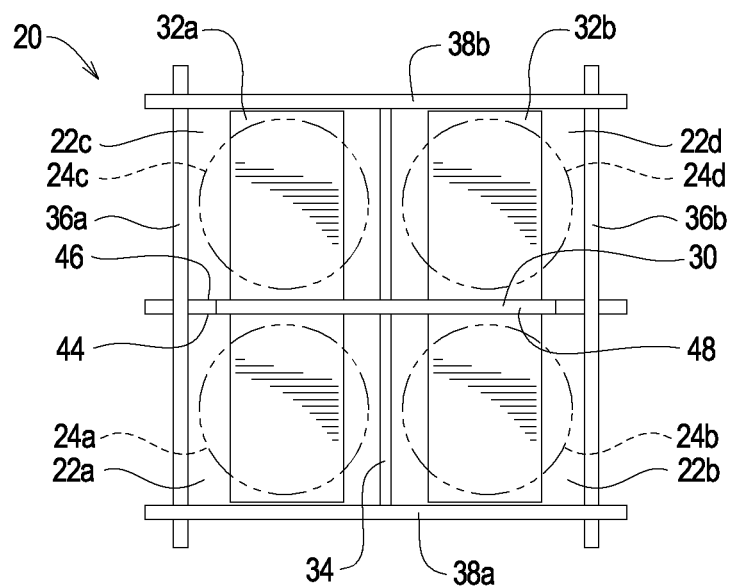
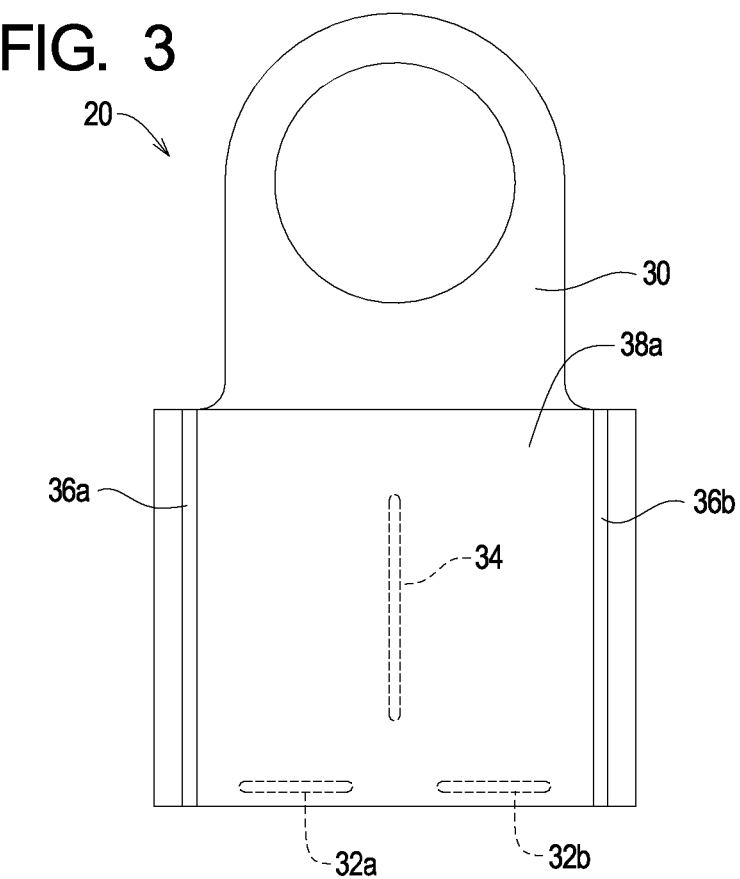

COLLAPSIBLE REUSABLE CARRIER

RELATED APPLICATIONS

This application, U.S. patent application Ser. No. 14/303,391 filed Jun. 12, 2014 claims benefit of U.S. Provisional Application Ser. No. 61/834,165 filed Jun. 12, 2013, the contents of which are incorporated herein by reference.

TECHNICAL FIELD

The present invention relates to carrying assemblies for beverage containers and, in particular, to carrying assemblies that may be stored and shipped flat and then assembled quickly and easily for use.

BACKGROUND

Beverages such often sold in glass or aluminum containers (e.g. beer and wine) or in paper to-go cups (e.g., coffee). In particular, fine wines and craft beers suitable for presentation as gifts are typically sold in single containers. If a purchaser desires to gift several single containers of fine wine and/or craft beer, several separate single containers must be transported. While bags may be used, bags are typically designed to store a single container and do not solve the problem of transporting multiple single containers. Folding cardboard containers for beer are typically not available for purchase at the point of sale and, in any event, are not sufficiently decorative for gift presentation.

With coffee, a person may purchase several coffees in single paper cups for gatherings such as a meeting. Coffee shops typically provide disposable containers made of cardboard for carrying up to four paper cups of coffee, but such containers are not decorative nor are they sturdy or easy to carry.

The need thus exists for portable carriers for items such as beverage containers that can be inexpensively manufactured, stored, and shipped, can be easily and quickly assembled at the point of purchase, and can be made of sturdy, reusable, and aesthetically pleasing materials.

SUMMARY

The present invention may be embodied as a carrier comprising a lifting assembly and a box assembly. The lifting assembly defines at least one platform surface and at least one shoulder portion. The box assembly defines at least one intermediate slot. The at least one intermediate slots receives a portion of the main member such that the at least one shoulder portion engages at least a portion of the box assembly to transfer downward loads on the box assembly to the lifting assembly.

The present invention may also be embodied as a method of carrying items comprising the following steps. A main member defining at least one platform opening and at least one shoulder portion is provided. At least one platform member is provided. A lifting assembly is formed by extending the at least one platform member partly through the at least one platform opening. First and second longitudinal wall members each defining first and second lateral slots and an intermediate slot are provided. First and second lateral wall members each defining first and second longitudinal slots are provided. A box assembly is formed by displacing the first and second longitudinal wall members relative to the first and second lateral wall members such that the first and second lateral slots receive portions of the first and second lateral wall members and the first and second longitudinal slots receive portions of the first and second longitudinal wall members. The box assembly is displaced relative to the lifting assembly such that the intermediate slots receive portions of the main member and the at least one shoulder portion engages at least one of the first and second longitudinal wall members.

The present invention may also be embodied as a carrier comprising a lifting assembly and a box assembly. The lifting assembly comprises a main member defining at least one platform opening and at least one shoulder portion and at least one platform member. The at least one platform member extends partly through the at least one platform opening. The box assembly comprises first and second longitudinal wall members each defining first and second lateral slots and an intermediate slot and first and second lateral wall members each defining first and second longitudinal slots. The first and second lateral slots receive portions of the first and second lateral wall members. The first and second longitudinal slots receive portions of the first and second longitudinal wall members. The intermediate slots receive portions of the main member such that the at least one shoulder portion engages at least one of the first and second longitudinal wall members.

BRIEF DESCRIPTION OF THE DRAWINGS

FIG. 1 is a perspective view of a first example carrier of the present invention;

FIG. 2 is a top plan view of the first example carrier illustrating the use of the first example carrier to store and/or carry multiple items such as beverage containers;

FIG. 3 is a side elevation view of the first example carrier;

DETAILED DESCRIPTION

Figure 4:
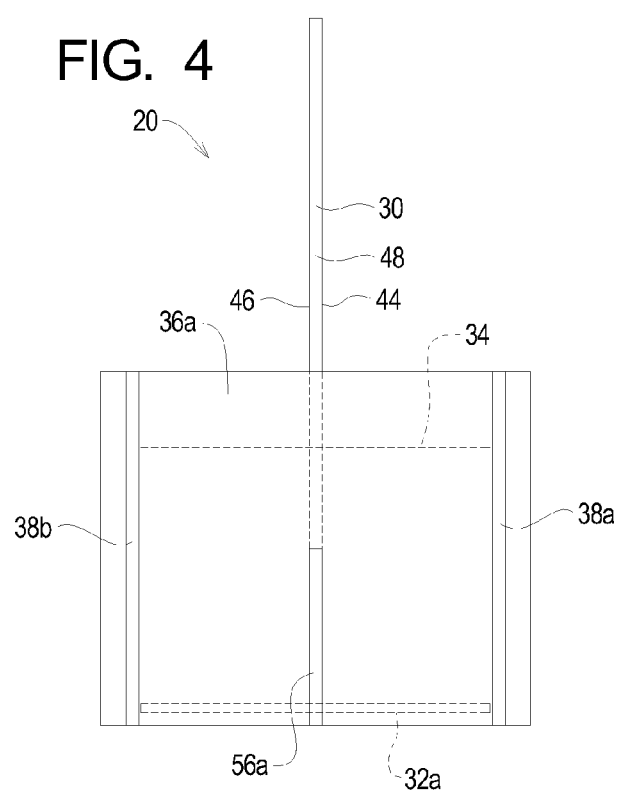
FIG. 4 is an end elevation view of the first example carrier.

Referring initially to FIGS. 1-6 and 9 of the drawing, depicted therein is a first example carrier 20 constructed in accordance with, and embodying, the principles of the present invention. The first example carrier 20 defines four compartments 22a, 22b, 22c, and 22d; the first example carrier 20 is thus adapted to contain one container 24 (e.g., FIG. 5) or up to four containers 24a, 24b, 24c, and 24d (e.g., FIG. 2). The first example carrier 20 may be used to contain two or three containers.

Figure 6:
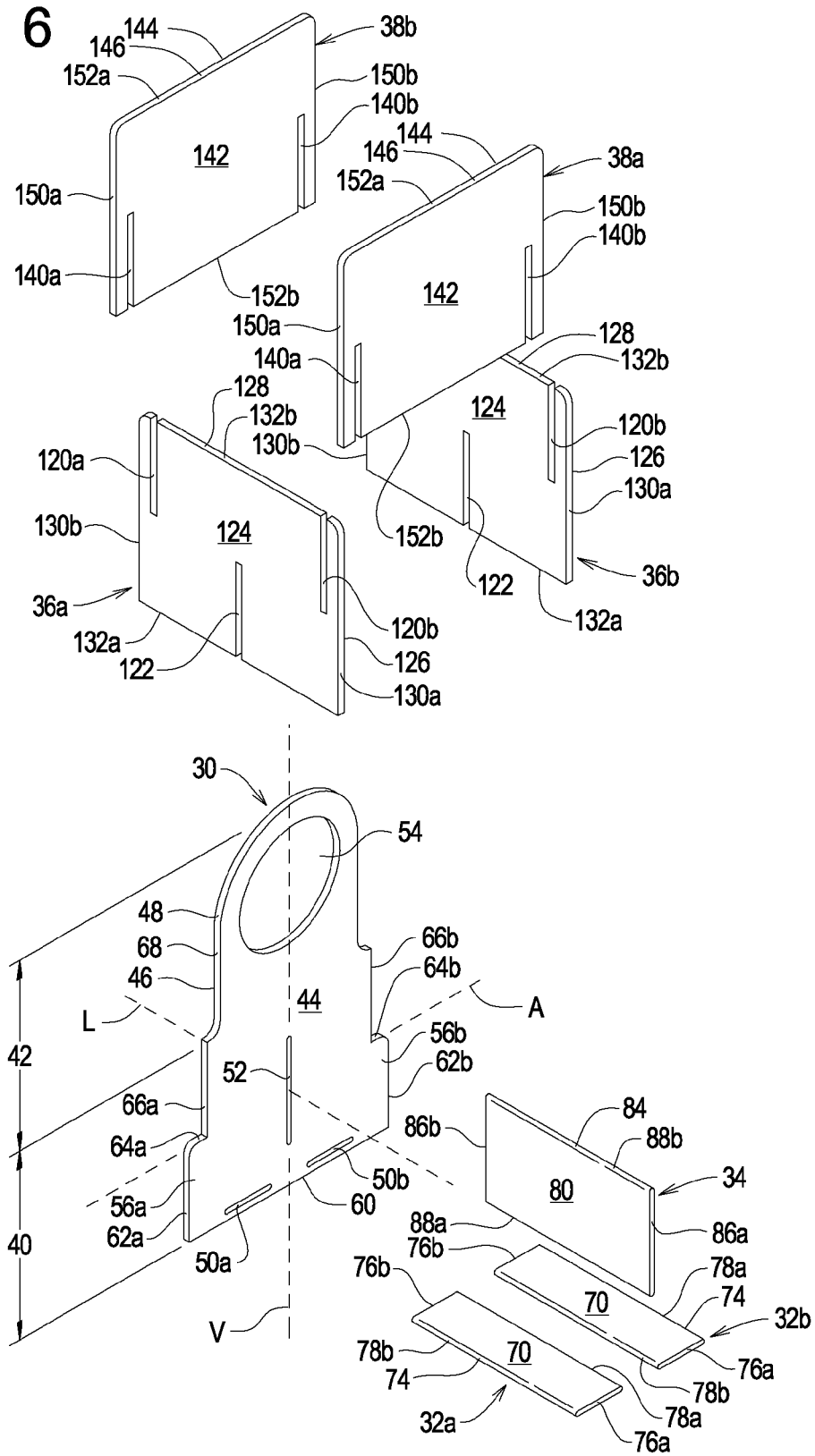
FIG. 6 is a perspective, exploded view illustrating the parts that are assembled to form the first example carrier.

As perhaps best shown in FIG. 6, the first example carrier 20 comprises a main member 30, first and second platform members 32a and 32b, a divider member 34, first and second longitudinal wall members 36a and 36b, and first and second lateral wall members 38a and 38b. FIG. 6 further illustrates that the main member 20 defines a longitudinal axis A, a vertical axis V, and a lateral axis L. In the first example carrier 20, the longitudinal wall members 36a and 36b are spaced from each other along the longitudinal axis A, and the lateral wall members 38a and 38b are spaced from each other along the lateral axis L.

Figure 5:
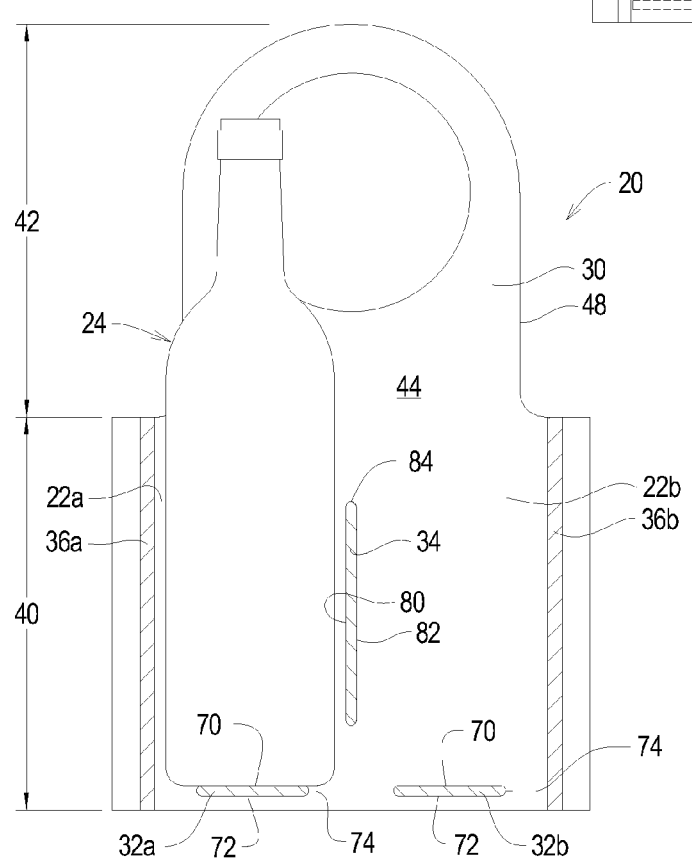
FIG. 5 is a side elevation section view of the first example carrier illustrating the use of the first example carrier to store and/or carry a beverage container.
Figure 7:
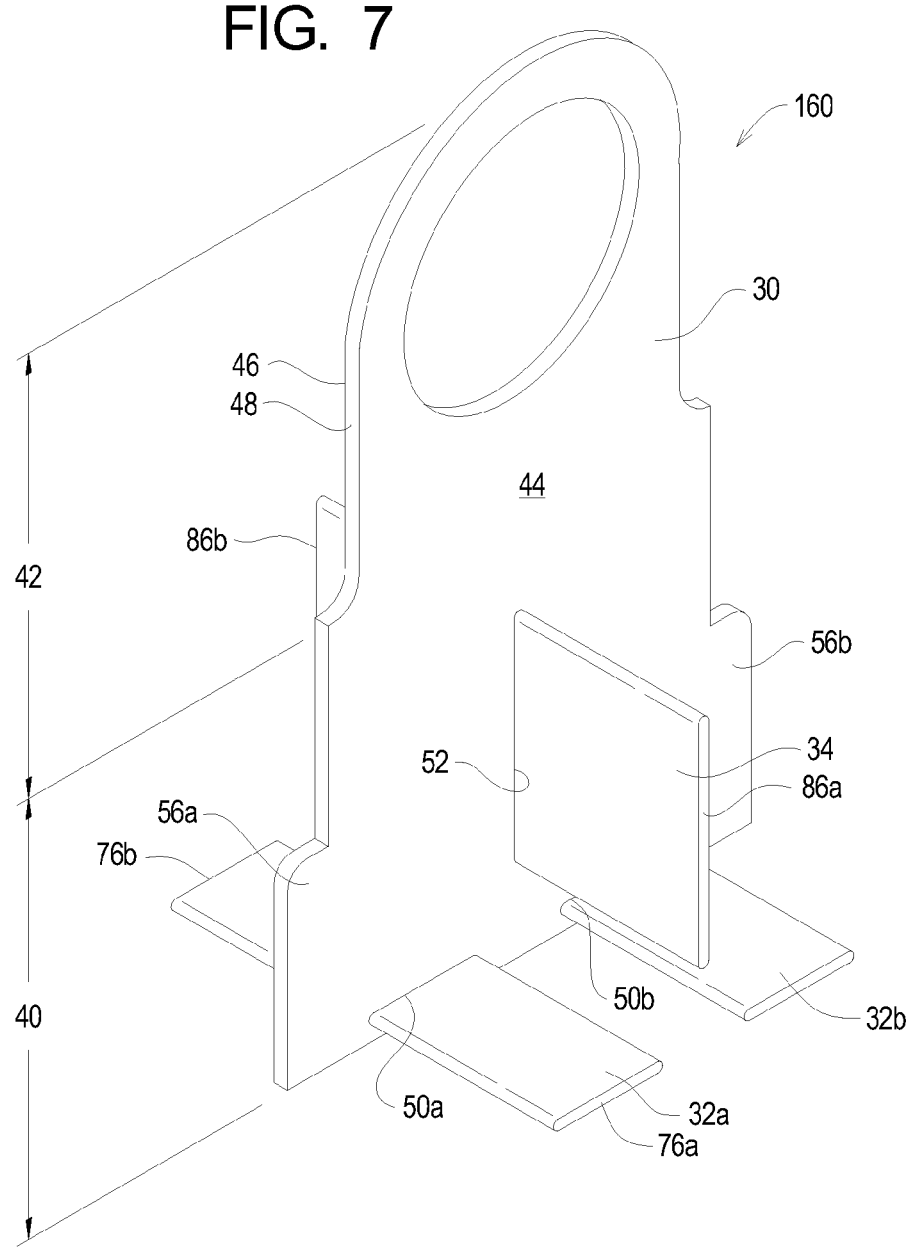
FIG. 7 is a perspective view illustrating a lifting subassembly of the first example carrier.

FIGS. 5, 6, and 7 illustrate that the main member 30 comprises a compartment portion 40 and a handle portion 42. The example main member 30 is a flat plate that defines a first main surface 44, a second main surface 46, and a main edge surface 48. The example main member 30 further defines first and second platform openings 50a and 50b, a divider opening 52, a handle opening 54, and first and second shoulder portions 56a and 56b. Alternatively, shoulder slots may be formed in the main member 30, with the bottoms of the shoulder slots performing the function of the shoulder portions 56a and 56b.

The main edge surface 48 defines a bottom edge portion 60, first and second lower edge portions 62a and 62b, first and second shoulder portions 64a and 64b, first and second intermediate portions 66a and 66b, and a handle edge portion 68.

The example platform members 32a and 32b are identical and are both formed from flat plates. Each of the example platform members 32a and 32b defines a first platform surface 70, and second platform surface 72, and a platform edge surface 74. The platform edge surface 74 defines first and second end edge portions 76a and 76b and first and second transverse edge portions 78a and 78b.

The example divider member 34 is also formed of a flat plate. The example divider member 34 defines a first divider surface 80, and second divider surface 82, and a divider edge surface 84. The divider edge surface 84 defines first and second end edge portions 86a and 86b and first and second transverse edge portions 88a and 88b.

The example longitudinal wall members 36a and 36b are also identical and are both formed of flat plates. Each of the example longitudinal wall members 36a and 36b defines first and second lateral slots 120a and 120b, an intermediate slot 122, a first longitudinal wall surface 124, a second longitudinal wall surface 126, and a longitudinal wall edge surface 128. The longitudinal wall edge surface 128 defines first and second end edge portions 130a and 130b and first and second transverse edge portions 132a and 132b.

The example lateral wall members 38a and 38b are also identical and are both formed of flat plates. Each of the example lateral wall members 38a and 38b defines first and second longitudinal slots 140a and 140b, a first lateral wall surface 142, a second lateral wall surface 144, and a lateral wall edge surface 146. The lateral wall edge surface 146 defines first and second end edge portions 150a and 150b and first and second transverse edge portions 152a and 152b.

As described above, the main member 30, the platform members 32a and 32b, the divider member 34, the longitudinal wall members 36a and 36b, and the lateral wall members 38a and 38b are all flat plates. Accordingly, when the first example carrier 20 is in a disassembled configuration, these members or flat plates 30, 32a, 32b, 34, 36a, 36b, 38a, and 38b may be stored in a flat configuration that takes up significantly less volume than the assembled first example carrier 20. The first example carrier 20 may thus be efficiently packaged during shipping, storage, and retail display.

Further, the platform members 32a and 32b, the divider member 34, the longitudinal wall members 36a and 36b, and the lateral wall members 38a and 38b may all be punched, cut, or otherwise formed out of flat stock material or injection molded using conventional techniques. The example members or flat plates 30, 32a, 32b, 34, 36a, 36b, 38a, and 38b are made of plywood, but other materials such as non-ply wood, plastic, cardboard, cardstock, metal, or the like may be also used.

The assembly of the first example carrier 20 from the main member 30, platform members 32a and 32b, the divider member 34, the longitudinal wall members 36a and 36b, and the lateral wall members 38a and 38b will now be described with reference to FIGS. 7-9.

Initially, FIG. 7 illustrates that a lifting subassembly 160 is formed by inserting the platform end edge portions 76a or 76b of the platform members 32a and 32b through the platform openings 50a and 50b of the main member 30 and inserting the divider end edge portions 86a or 86b of the divider member 34 through the divider opening 52 of the main member 30. At this point, approximately half of the platform members 32a and 32b and half of the divider member 34 should be arranged on each side of the main member 30. Lines, notches, or other indicia may be formed on the platform members 32a and 32b and/or divider member 34 to facilitate proper positioning of the platform members 32a and 32b and divider member 34 relative to the main member 30.

Figure 8:
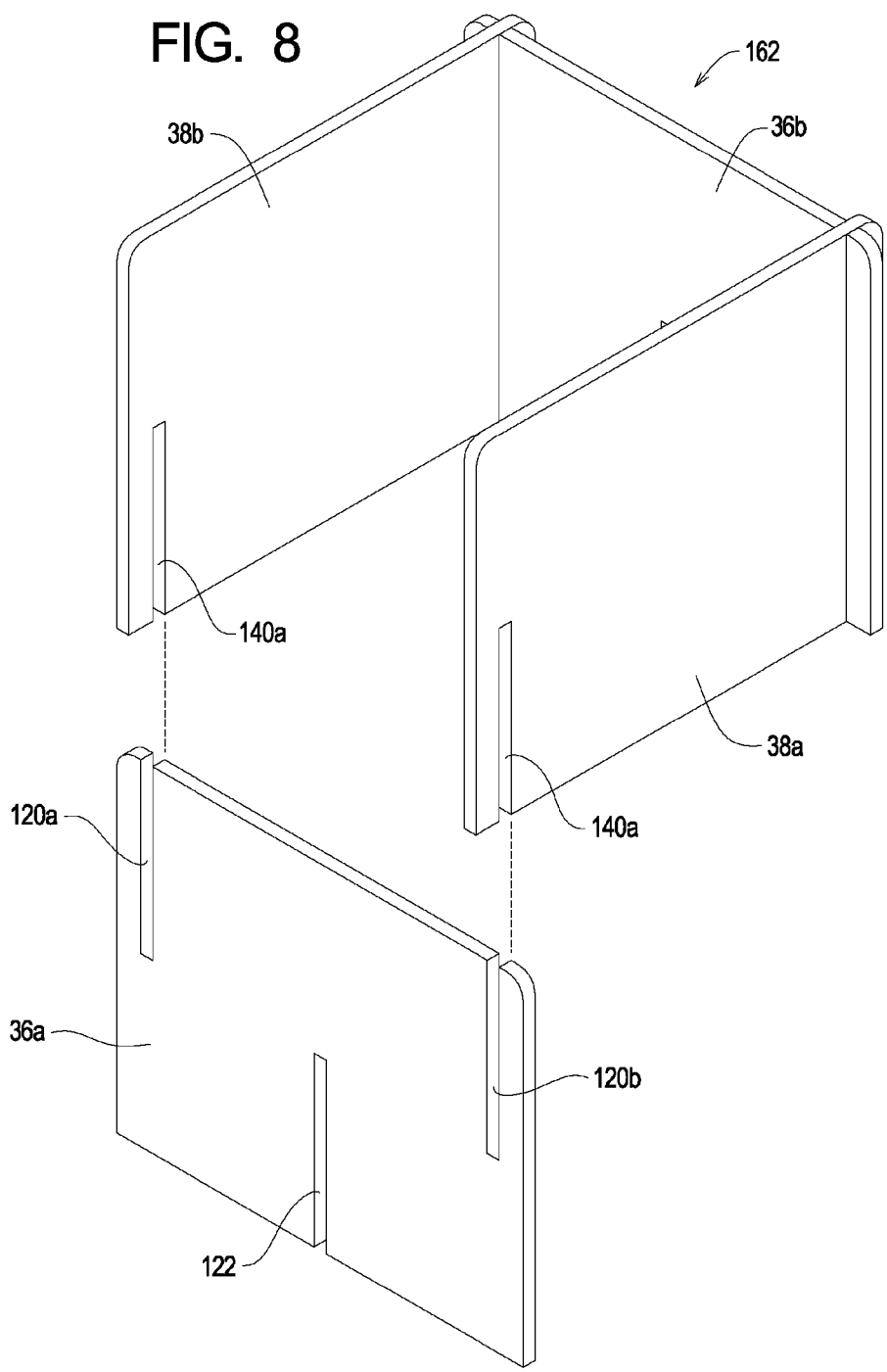
FIG. 8 is a perspective view illustrating the formation of a box subassembly of the first example carrier.

Referring now to FIG. 8, it can be seen that the longitudinal wall members 36a and 36b and lateral wall members 38a and 38b are combined to form a box subassembly 162. In particular, the longitudinal wall members 36a and 36b are arranged relative to the lateral wall members 38a and 38b such that the lateral slots 120 are aligned with, and face, the longitudinal slots 140. In particular, the longitudinal wall members 36a and 36b are arranged with the lateral slots 120a and 120b facing up and the intermediate slots 122 facing down. The lateral wall members 38a and 38b are arranged with the longitudinal slots 140a and 140b facing down. The longitudinal wall members 36a and 36b are then displaced relative to the lateral wall members 38a and 38b such that the lateral slots 120 receive portions of the lateral wall members 38a and 38b and the longitudinal slots 140 receive portions of the longitudinal wall members 36a and 36b. The box subassembly 162 is formed when the longitudinal wall members 36a and 36b are displaced relative to the lateral wall members 38a and 38b as far as possible.

Figure 9:
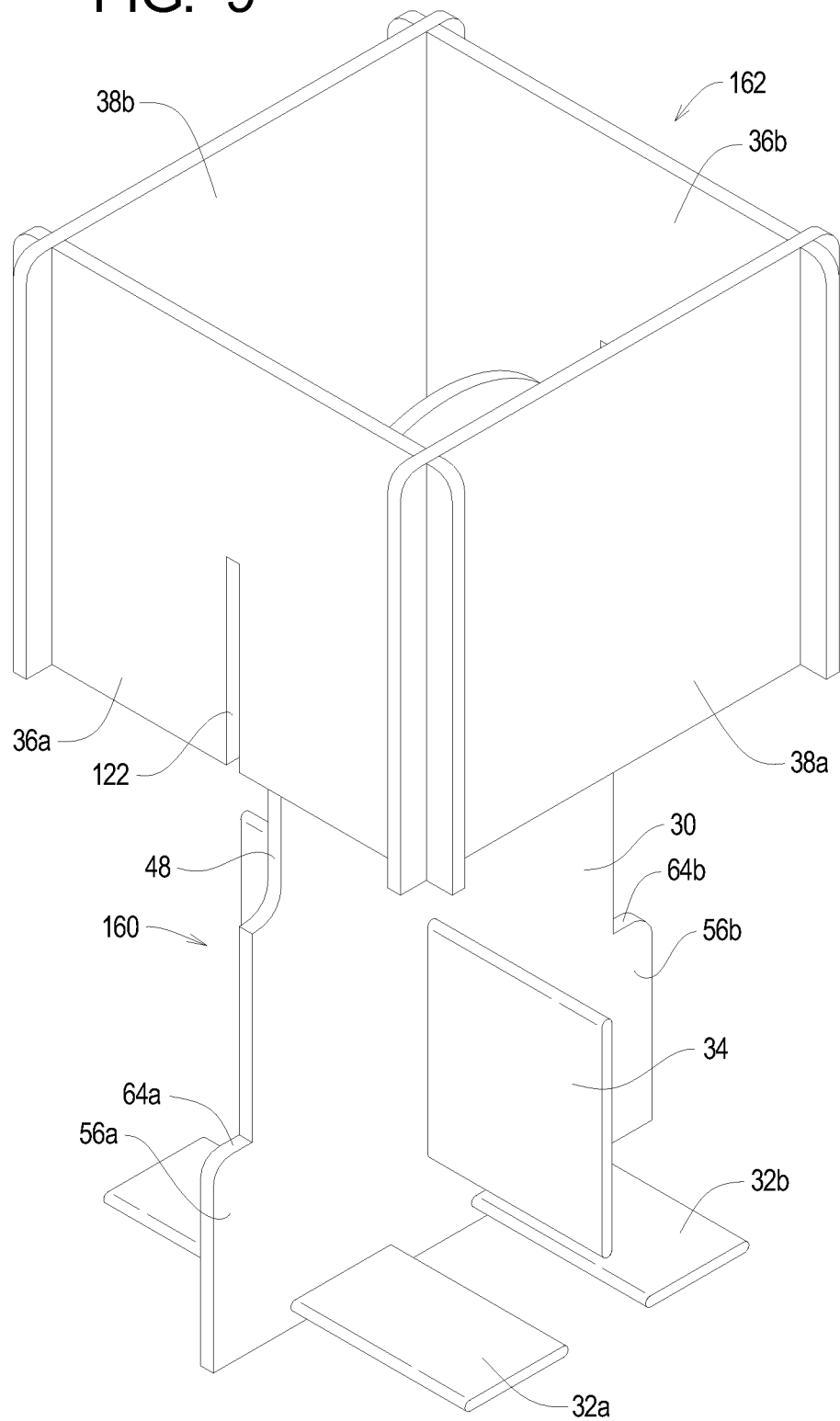
FIG. 9 is a perspective view illustrating the formation of the first example carrier from the lifting subassembly and the box subassembly.

FIG. 9 illustrates that the lifting subassembly 160 is then located below the box subassembly 162 such that the shoulder portions 56a and 56b are aligned with the intermediate slots 122 and the intermediate slots 122 face the shoulder portions 56a and 56b. The lifting subassembly 160 and the box subassembly 162 are then displaced relative to each other such that the intermediate slots 122 receive the shoulder portions 56a and 56b. At this point, the first example carrier 20 is in its assembled configuration as shown in FIG. 1.

With the first example carrier 20 formed as described above, the shoulder portions 64a and 64b of the main edge surface 48 come into contact with the ends of the intermediate slots 122 such that upward displacement of the lifting subassembly 160 causes upward displacement of the box subassembly 162. In particular, shoulder portions 56a and 56b of the main member 30 engage the intermediate slots 122 such that downward loads on the longitudinal wall members 36a and 36b are transferred to the shoulder portions 56a and 56b and thus to the main member 30. Similarly, downward loads on the lateral wall members 38a and 38b are transferred to the longitudinal wall members 36a and 36b through the ends of the notches 120 and 140. Gravity and tight tolerances between adjacent surfaces hold the first example carrier 20 in its assembled configuration. But the first example carrier 20 may be converted back into its disassembled configuration by using deliberate application of manual force to reverse the assembly process described above.

During normal use of the first example carrier system 20, the first and second main surfaces 44 and 46 of main member 30, the first and second divider surfaces 80 and 82 of the divider member, the first and second longitudinal wall surfaces 124 and 126, and the first and second lateral wall surfaces 142 and 144 are substantially vertical. The first and second platform surfaces 70 and 72 are substantially horizontal during normal use. Accordingly, one or more containers 24 may be placed into the compartments 22a, 22b, 22c, and 24d defined by the first example carrier 20 such that the containers 24 are supported vertically by the platform members 32a and 32b and prevented from falling in the longitudinal and lateral directions by the longitudinal wall members 36a and 36b and/or the lateral wall members 38a and 38b.

Referring back to FIG. 1, it can be seen that the first and second main surfaces 44 and 46 within the handle portion 42 of the main member 20 and the exposed surfaces of the longitudinal wall members 36a and 36b and the lateral wall members 38a and 38b are easily visible during normal use of the first example carrier 20. Indicia or other decorations may be painted, printed, or burned onto or cut into the main member 20 and the wall members 36a, 36b, 38a, and 38b. For example, a retail store may have its name and/or logo imprinted on the members 30, 36a, 36b, 38a, and 38b. As another example, seasonal or celebratory indicia may formed on the members 30, 36a, 36b, 38a, and 38b to enhance the desirability of the first example carrier 20.

Figure 10:
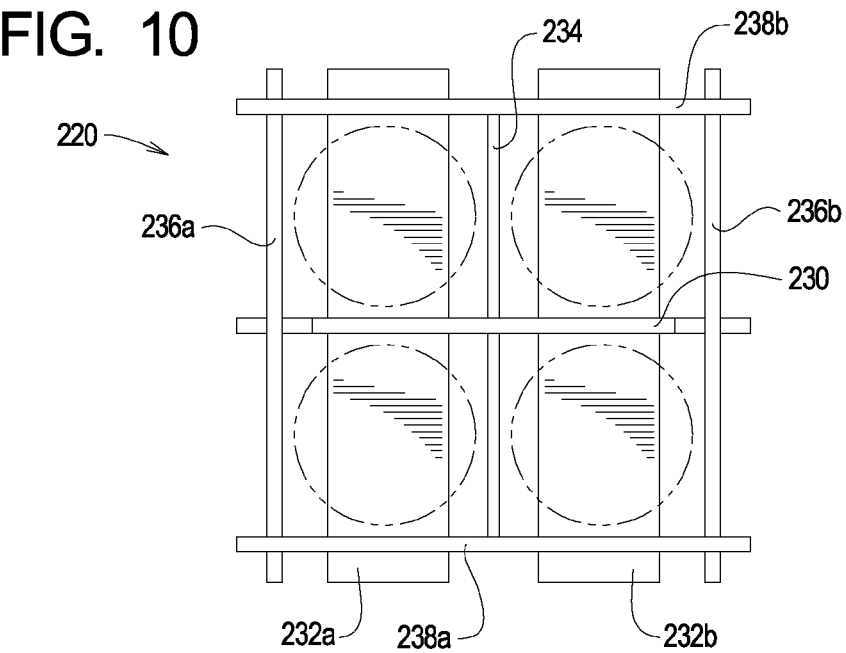
FIG. 10 is a top plan view of a second example carrier of the present invention.
Figure 11:
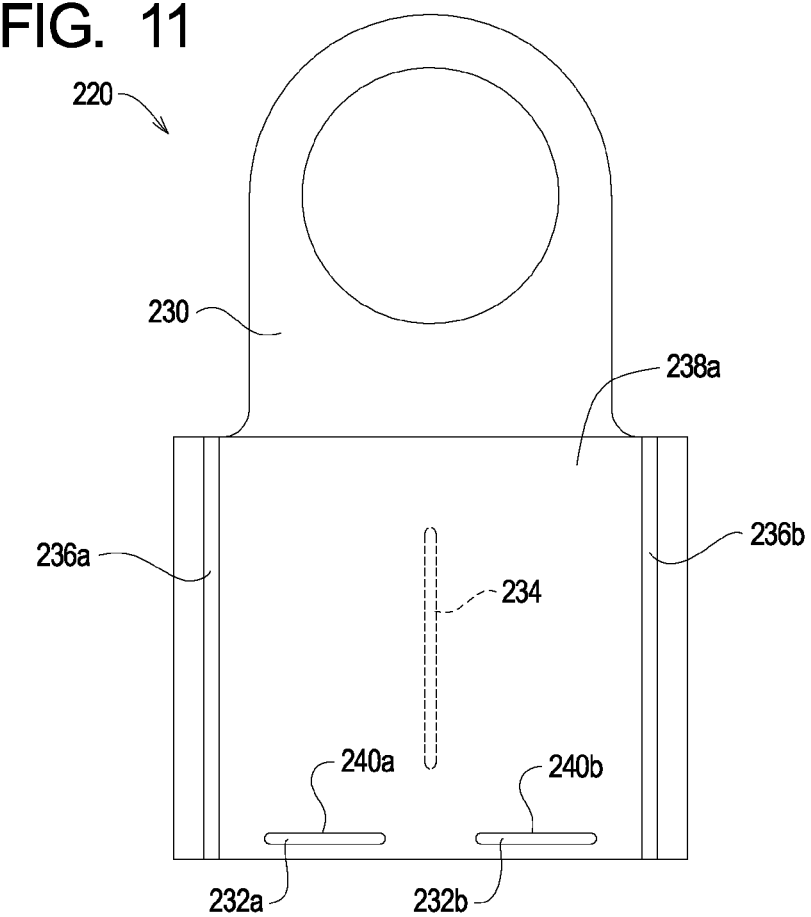
FIG. 11 is a side elevation view of the second example carrier.
Figure 12:
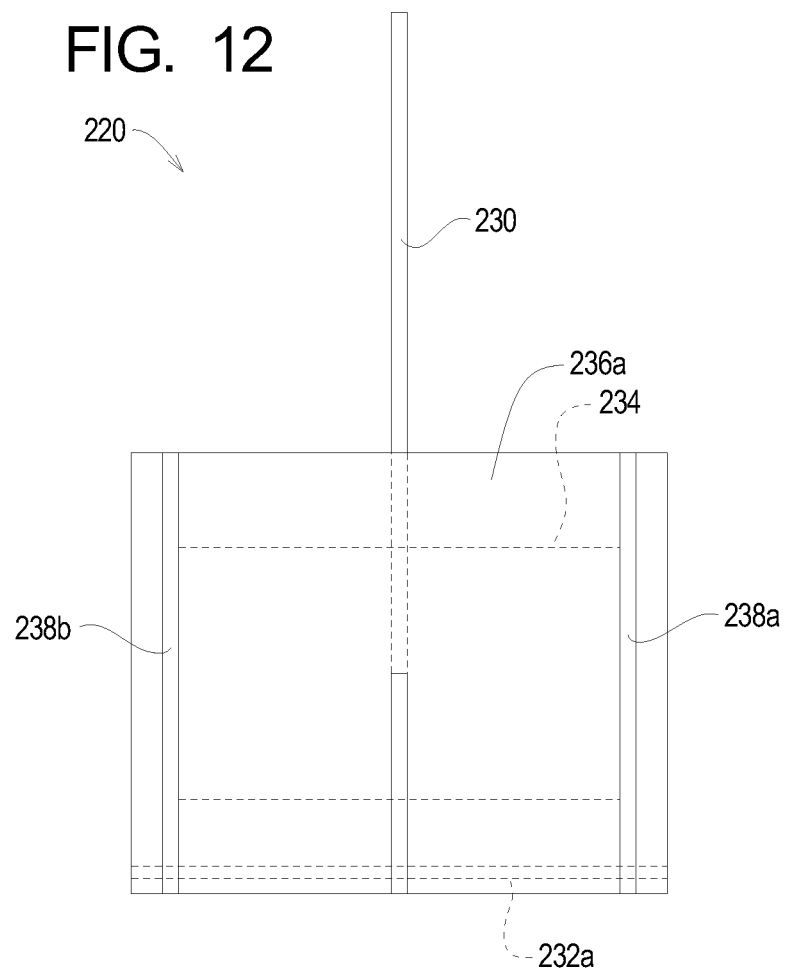
FIG. 12 is an end elevation view of the second example carrier.

Referring now to FIGS. 10-12 of the drawing, depicted therein is a second example carrier 220 constructed in accordance with, and embodying, the principles of the present invention. Like the first example carrier 20, the second example carrier 220 defines four compartments 222a, 222b, 222c, and 222d and may be used to contain one, two, three, or four containers 224a, 224b, 224c, and 224d.

As perhaps best shown in FIG. 10, the second example carrier 220 comprises a main member 230, first and second platform members 232a and 232b, a divider member 234, first and second longitudinal wall members 236a and 236b, and first and second lateral wall members 238a and 238b. FIGS. 10-12 further illustrate that the main member 230, divider member 234, and first and second longitudinal wall members 236a and 236b are the same as the example main member 30, divider member 34, and first and second longitudinal wall members 36a and 36b described above.

The first and second platform members 232a and 232b are similar to the first and second platform members 32a and 32b described above but are longer relative to the distance between the first and second lateral wall members 238a and 228b. Further, the first and second lateral wall members 238a and 238b are similar to the first and second lateral wall members 38a and 38b as described above, but first and second extension openings 240a and 240b are formed in the first and second lateral wall members 228a and 228b. End portions of the example first and second platform members extend partly through the extension openings 240a and 240b; the extension openings 240a and 240b thus accommodate the relatively longer first and second platform members 232a and 232b as shown in FIGS. 10-12. In the second example carrier 220, the first and second lateral wall members 238a and 238b thus support the ends of the first and second platform members 232a and 232b.

Figure 13:
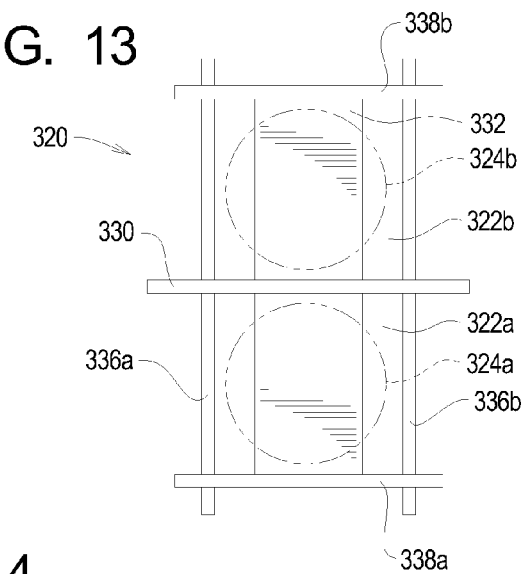
FIG. 13 is a top plan view of a third example carrier of the present invention.
Figure 14:
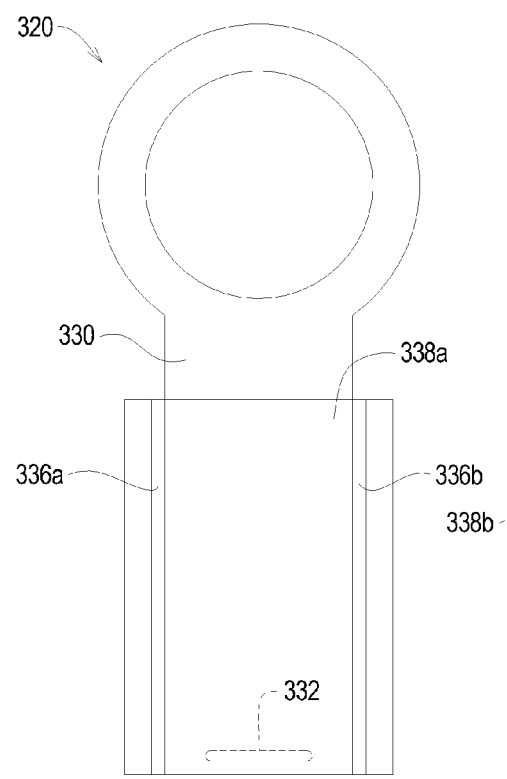
FIG. 14 is a side elevation view of the third example carrier.
Figure 15:
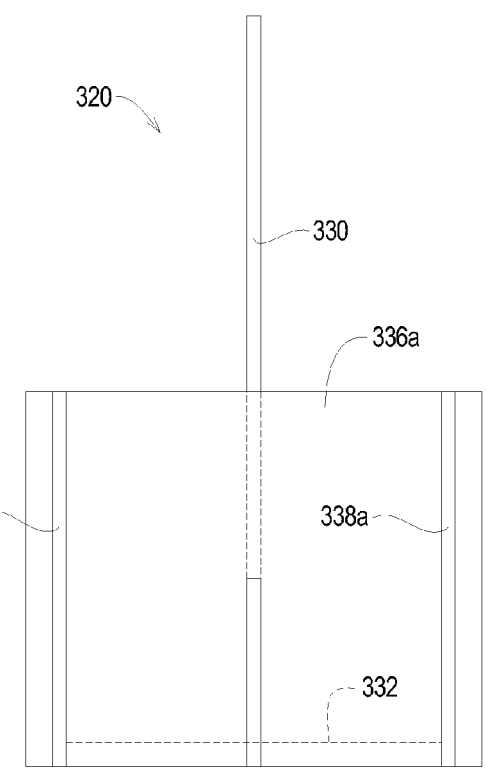
FIG. 15 is an end elevation view of the third example carrier.

Referring now to FIGS. 13-15 of the drawing, depicted therein is a third example carrier 320 constructed in accordance with, and embodying, the principles of the present invention. The second example carrier 320 defines two compartments 322a and 322b and may be used to contain one or two containers 324a and 324b.

As perhaps best shown in FIG. 13, the second example carrier 320 comprises a main member 330, a platform member 332, first and second longitudinal wall members 336a and 336b, and first and second lateral wall members 338a and 338b. The third example carrier 320 does not require a divider member such as the divider member 34 described above.

Figure 16:
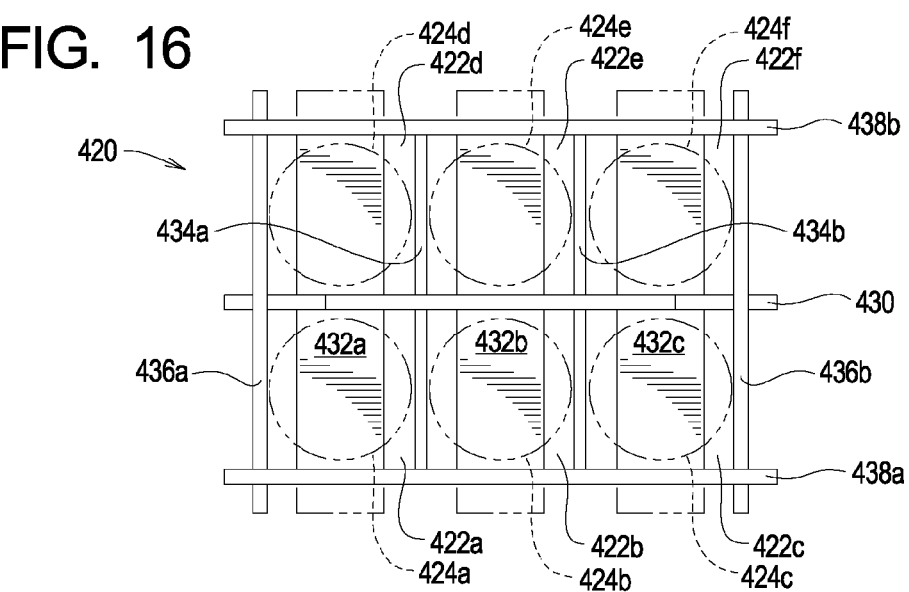
FIG. 16 is a top plan view of a fourth example carrier of the present invention.
Figure 17:
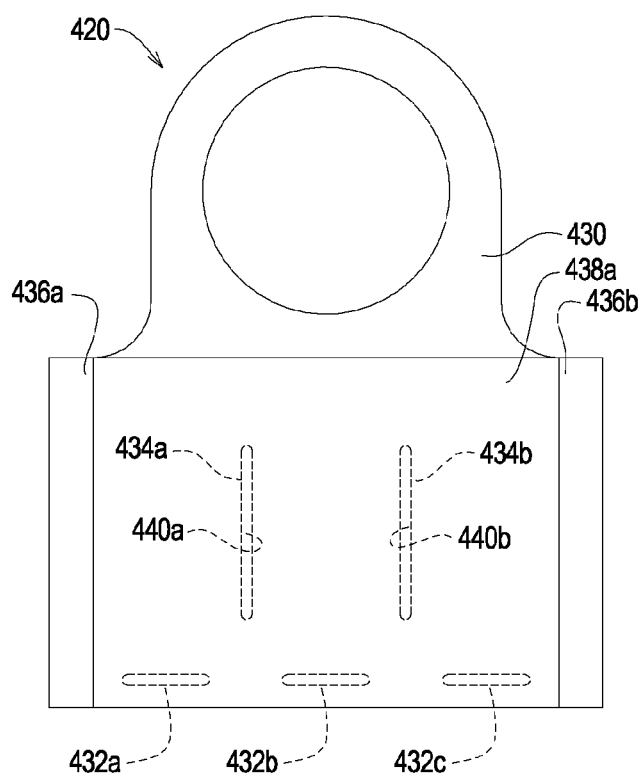
FIG. 17 is a side elevation view of the fourth example carrier.
Figure 18:
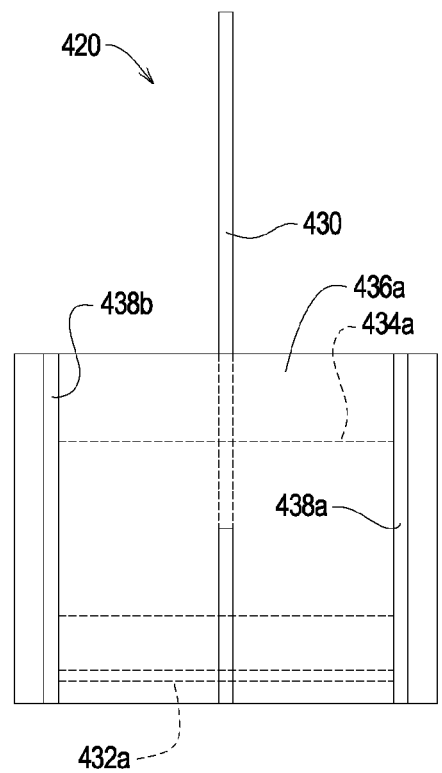
FIG. 18 is an end elevation view of the fourth example carrier.

Referring now to FIGS. 16-18 of the drawing, depicted therein is a fourth example carrier 420 constructed in accordance with, and embodying, the principles of the present invention. The fourth example carrier 420 defines six compartments 422a, 422b, 422c, 422d, 422e, and 422f and may be used to contain one, two, three, four, five, or six containers 424a, 424b, 424c, 424d, 424e, and 424f.

As perhaps best shown in FIG. 16, the second example carrier 420 comprises a main member 430, first, second, and third platform members 432a, 432b, and 432c, first and second divider members 434a and 434b, first and second longitudinal wall members 436a and 436b, and first and second lateral wall members 438a and 438b. FIGS. 16-18 further illustrate that the divider members 434a and 434b, first and second longitudinal wall members 436a and 436b, and first and second lateral wall members 438a and 438b are similar to the example divider member 34, first and second longitudinal wall members 36a and 36b, and first and second lateral wall members 38a and 38b described above, respectively.

FIG. 17 illustrates that the example main member 430 is or may be similar to the main member 30 described above but that first, second, and third platform openings 440a, 440b, 440c are provided to accommodate the first, second, and third platform members 432a, 432b, and 432c and that first and second divider openings 440a and 440b are formed to accommodate the first and second divider members 434a and 434b.

Figure 19:
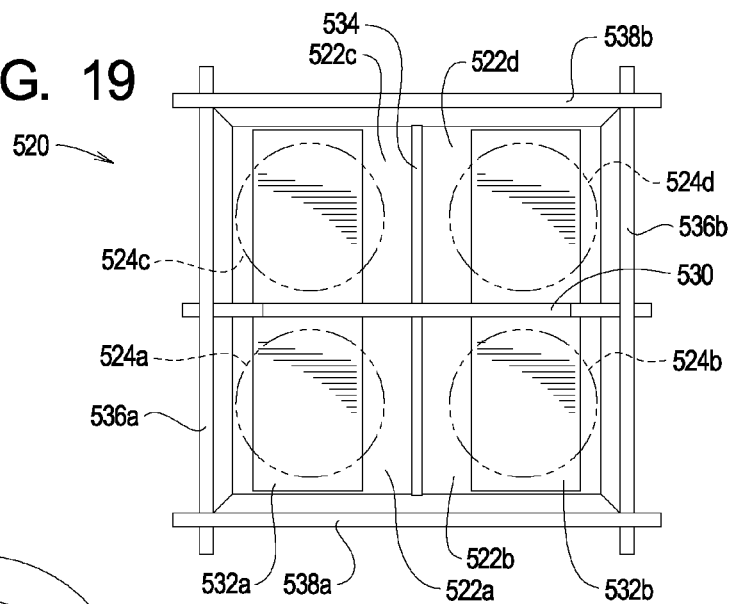
FIG. 19 is a top plan view of a fifth example carrier of the present invention.
Figure 20:
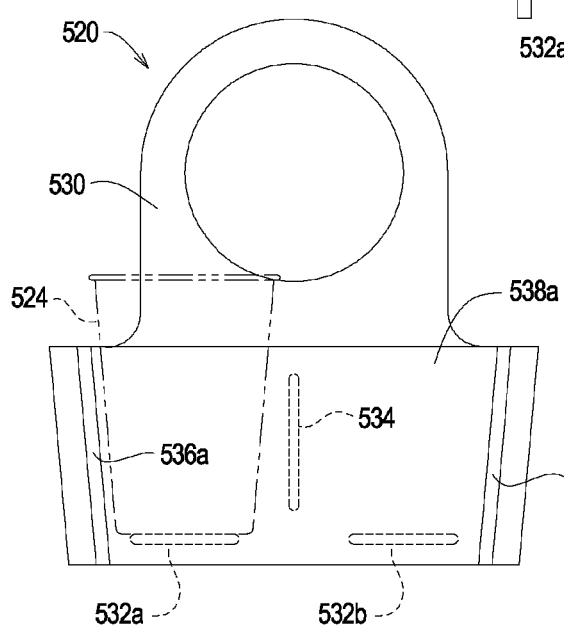
FIG. 20 is a side elevation view of the fifth example carrier.
Figure 21:
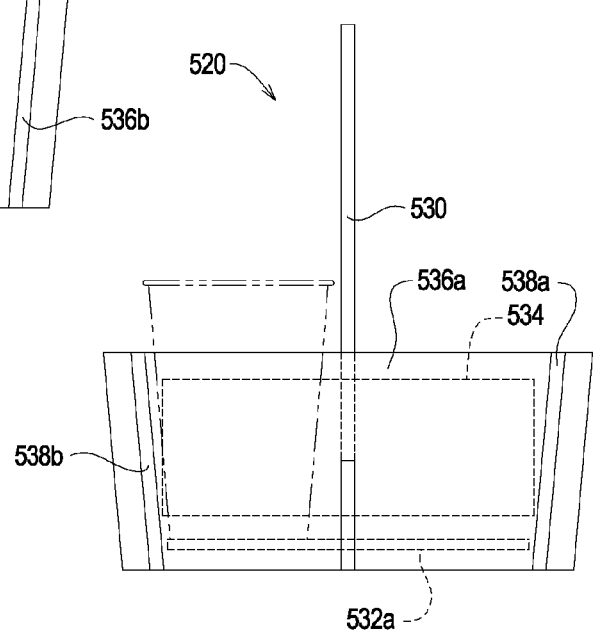
FIG. 21 is an end elevation view of the fifth example carrier.

Referring now to FIGS. 19-21 of the drawing, depicted therein is a fifth example carrier 520 constructed in accordance with, and embodying, the principles of the present invention. Like the first example carriers 20 and 220, the fifth example carrier 520 defines four compartments 522a, 522b, 522c, and 522d and may be used to contain one, two, three, or four containers 524a, 524b, 524c, and 524d.

As perhaps best shown in FIG. 19, the second example carrier 520 comprises a main member 530, first and second platform members 532a and 532b, a divider member 534, first and second longitudinal wall members 536a and 536b, and first and second lateral wall members 538a and 538b. FIGS. 19-20 further illustrate that the main member 530, platform members 532a and 532b, and divider member 534 are or may be similar to the example main member 30, platform members 32a and 32b, and divider member 34 described above.

The example first and second longitudinal wall members 536a and 536b and lateral wall members 538a and 538b are the similar to the example first and second longitudinal wall members 36a and 36b and first and second lateral wall members 38a and 38b described above but the lateral slots 120 and longitudinal slots 140 are angled such that the wall members 536a and 536b and lateral wall members 538a and 538b are angled with respect to the vertical axis defined by the main member 30. The fifth example carrier 520 is optimized for the carrying of containers 524 with slanted walls such as paper coffee cups or the like.

What is claimed is:

1. A method of carrying items comprising the steps of:
   providing a main member defining at least one platform opening and at least one shoulder portion;
   providing at least one platform member;
   forming a lifting assembly by extending the at least one platform member partly through the at least one platform opening;
   providing first and second longitudinal wall members each defining first and second lateral slots and an intermediate slot;
   providing first and second lateral wall members each defining first and second longitudinal slots;
   forming a box assembly by displacing the first and second longitudinal wall members relative to the first and second lateral wall members such that the first and second lateral slots receive portions of the first and second lateral wall members, and
      the first and second longitudinal slots receive portions of the first and second longitudinal wall members; and
   displacing the box assembly relative to the lifting assembly such that the intermediate slots receive portions of the main member, and
      the at least one shoulder portion engages at least one of the first and second longitudinal wall members.

2. A method as recited in claim 1, further comprising the steps of:
   providing at least one divider member;
   forming at least one divider opening in the main member; and
   extending the at least one divider member partly through the at least one divider opening.

3. A method as recited in claim 2, further comprising the steps of:
   providing first and second platform members, and
   providing one divider member; and
   forming first and second platform openings in the main member;
   extending the first and second platform members partly through the first and second platform openings, respectively.

4. A method as recited in claim 1, further comprising the steps of:
   forming at least one extension opening in each of the lateral wall members; and
   arranging the at least one platform member to extend partly through the at least one extension opening.

5. A method as recited in claim 3, further comprising the steps of:
   forming first and second extension openings in each of the lateral wall members; and
   arranging the first and second platform members to extend partly through the first and second extension openings, respectively.

6. A method as recited in claim 2, further comprising the steps of:
   providing first, second, and third platform members;
   providing first and second divider members;
   forming first, second, and third platform openings in the main member;
   forming first and second divider openings in the main member;
   extending the first, second, and third platform members partly through the first, second, and third platform openings, respectively; and
   extending the first and second divider members partly through the first and second divider openings, respectively.

7. A carrier comprising:
   a lifting assembly comprising
      a main member defining at least one platform opening and at least one shoulder portion, and
      at least one platform member, where
         the at least one platform member extends partly through the at least one platform opening; and
   a box assembly comprising
      first and second longitudinal wall members each defining first and second lateral slots and an intermediate slot, and
      first and second lateral wall members each defining first and second longitudinal slots, where
         the first and second lateral slots receive portions of the first and second lateral wall members, and
         the first and second longitudinal slots receive portions of the first and second longitudinal wall members; wherein
   the intermediate slots receive portions of the main member such that the at least one shoulder portion engages at least one of the first and second longitudinal wall members.

8. A carrier as recited in claim 7, in which:
   the lifting assembly further comprises at least one divider member; and
   the main member further defines at least one divider opening; where
   the at least one divider member extends partly through the at least one divider opening.

9. A carrier as recited in claim 8, in which:
   the lifting assembly comprises
      first and second platform members, and
      one divider member; and
   the main member further defines first and second platform openings; where
   the first and second platform members extend partly through the first and second platform openings, respectively.

10. A carrier as recited in claim 7, in which:
   the lateral wall members each further define at least one extension opening; and the at least one platform member extends partly through the at least one extension opening.

11. A carrier as recited in claim 9, in which:

the lateral wall members each further define first and second extension openings; and the first and second platform members extend partly through the first and second extension openings, respectively.

12. A carrier as recited in claim 8, in which:

the lifting assembly comprises
 first, second, and third platform members, and
 first and second divider members; and the main member further defines
 first, second, and third platform openings, and
 first and second divider openings; where the first, second, and third platform members extend partly through the first, second, and third platform openings, respectively; and the first and second divider members extend partly through the first and second divider openings, respectively.

* * * * *